(12) United States Patent
Yamamura et al.

(10) Patent No.: US 10,451,495 B2
(45) Date of Patent: Oct. 22, 2019

(54) FORCE DETECTION DEVICE AND ROBOT HAVING A VOLTAGE GENERATING CIRCUIT

(71) Applicant: Seiko Epson Corporation, Tokyo (JP)

(72) Inventors: Mitsuhiro Yamamura, Suwa (JP); Toshiyuki Kamiya, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/964,621

(22) Filed: Apr. 27, 2018

(65) Prior Publication Data

US 2018/0313704 A1     Nov. 1, 2018

(30) Foreign Application Priority Data

Apr. 28, 2017 (JP) ................................ 2017-090242

(51) Int. Cl.

| | |
|---|---|
| *G01L 5/16* | (2006.01) |
| *G01L 1/16* | (2006.01) |
| *H01L 41/113* | (2006.01) |
| *H01L 41/313* | (2013.01) |
| *H01L 41/18* | (2006.01) |
| *G01L 5/00* | (2006.01) |
| *B25J 18/04* | (2006.01) |
| *B25J 13/08* | (2006.01) |
| *B25J 19/02* | (2006.01) |
| *G01L 1/14* | (2006.01) |

(52) U.S. Cl.
CPC ............... *G01L 1/16* (2013.01); *B25J 13/085* (2013.01); *B25J 18/04* (2013.01); *B25J 19/028* (2013.01); *G01L 1/144* (2013.01); *G01L 5/009* (2013.01)

(58) Field of Classification Search
CPC ......... G01L 1/205; G01L 1/225; H01H 13/78; H01H 2201/038; H01H 2205/016; H01H 2225/018; H01H 2203/038; H01H 13/807; H01H 2215/004; H01H 2225/03; H01H 13/16; H01H 13/10; H01H 2231/026; H01H 13/50; H03K 17/9625; H01C 10/10; H04M 1/23; G01G 19/4142; B60R 21/01516; B60N 2/7094; B60N 2/002; B60N 2/90
See application file for complete search history.

(56) References Cited

U.S. PATENT DOCUMENTS

| | | | |
|---|---|---|---|
| 6,810,747 B2 * | 11/2004 | Engler | ...................... G01L 5/24 73/761 |
| 2012/0204656 A1 * | 8/2012 | Suzuki | ................... G01L 1/162 73/862.59 |

(Continued)

FOREIGN PATENT DOCUMENTS

JP     2015-001384 A     1/2015

*Primary Examiner* — Brandi N Hopkins
(74) *Attorney, Agent, or Firm* — Harness, Dickey & Pierce, P.L.C.

(57) ABSTRACT

A force detection device includes: a force sensor that has a piezoelectric element receiving a force and outputting a charge; a pre-compression unit that pre-compresses the force sensor; and a conversion output circuit that receives the charge from the force sensor and outputs a voltage. The pre-compression unit is short-circuited with a first ground of the conversion output circuit. The pre-compression unit has the same potential as the first ground. The force detection device includes a casing that accommodates the force sensor and the conversion output circuit. The casing is short-circuited with a second ground.

11 Claims, 12 Drawing Sheets

(56) References Cited

U.S. PATENT DOCUMENTS

| | | | |
|---|---|---|---|
| 2012/0260745 A1* | 10/2012 | Tsuchiya | B25J 13/085 73/862.59 |
| 2013/0152700 A1* | 6/2013 | Kamiya | B25J 9/00 73/862.043 |
| 2013/0233089 A1* | 9/2013 | Kawai | B25J 13/085 73/862.68 |
| 2014/0366646 A1 | 12/2014 | Matsuzawa et al. | |
| 2015/0120052 A1* | 4/2015 | Mizushima | G01L 1/16 700/258 |

* cited by examiner

FORCE DETECTION DEVICE AND ROBOT HAVING A VOLTAGE GENERATING CIRCUIT

BACKGROUND

1. Technical Field

The present invention relates to a force detection device and a robot.

2. Related Art

For example, as a force detection device detecting a received force, a configuration disclosed in JP-A-2015-1384 is known. A force detection device disclosed in JP-A-2015-1384 includes a first base unit, a second base unit, a sensor device interposed between the first and second base units, a pre-compression bolt that connects the first and second base units to each other and pre-compresses the sensor device between the first and second base units, and a circuit substrate (a charge amplifier circuit) that is electrically connected to the sensor device.

A device that deals with a minute signal as in the force detection device disclosed in JP-A-2015-1384 generally includes a signal GND that serves as a reference potential of a circuit and a frame GND that serves as a reference positional of the first and second base units in order to shield disturbance noise. The signal GND and the frame GND are connected via a master GND of low impedance so that disturbance noise flowing in the frame GND does not propagate to the signal GND.

An operation current of a circuit normally flows in a wiring resistor present between the signal GND and the master GND and a contact resistor of a connector, and thus the signal GND has a high potential (for example, about several mV to about tens of mV) with respect to the master GND. On the other hand, a minute current merely flows at a moment at which disturbance noise flows between the frame GND and the master GND, and thus a steady current is almost 0 (zero). Therefore, the frame GND has the same potential as the master GND. In this way, the signal GND has a higher potential as the frame GND, for example. Thus, a leakage current may start flowing steadily in the frame GND from an input wiring of a charge amplifier circuit. Then, since the flowing leakage current is amplified by the charge amplifier circuit and is output, an output voltage of the charge amplifier circuit deviates from an output voltage corresponding to an actually received force (a drift may occur). Therefore, in the force detection device disclosed in JP-A-2015-1384, it is difficult to detect a force with high precision.

SUMMARY

An advantage of some aspects of the invention is that it provides a force detection unit and a robot that reduce a drift and have high force detection characteristics.

The advantage can be achieved by the following configurations.

A force detection device according to an aspect of the invention includes: a force sensor that has a piezoelectric element receiving a force and outputting a charge; a pre-compression unit that pre-compresses the force sensor; and a conversion output circuit that receives the charge from the force sensor and outputs a voltage. The pre-compression unit is short-circuited with a first ground of the conversion output circuit.

With this configuration, it is possible to obtain the force detection device that reduces a drift and has high force detection characteristics.

In the force detection device according to the aspect of the invention, it is preferable that the pre-compression unit has a same potential as the first ground.

With this configuration, it is possible to effectively reduce the drift and have the high force detection characteristics.

It is preferable that the force detection device according to the aspect of the invention further includes a casing that accommodates the force sensor and the conversion output circuit. The casing is preferably short-circuited with a second ground.

With this configuration, the force detection device can shield disturbance noise, and thus detect a received force with higher precision.

A force detection device according to another aspect of the invention includes: a force sensor that has a piezoelectric element receiving a force and outputting a charge; a pre-compression unit that pre-compresses the force sensor; a conversion output circuit that receives the charge from the force sensor and outputs a voltage; and a voltage generation circuit that applies the voltage to the pre-compression unit.

With this configuration, it is possible to obtain the force detection device that reduces the drift and has high force detection characteristics.

In the force detection device according to the aspect of the invention, it is preferable that the voltage generation circuit includes a voltage source and an attenuation circuit that drops a voltage of the voltage source.

With this configuration, it is easy to apply a feeble voltage to the pre-compression unit.

In the force detection device according to the aspect of the invention, it is preferable that the conversion output circuit includes a charge amplifier unit and a wiring electrically connecting the force sensor to the charge amplifier unit, and the voltage generation circuit applies the voltage to the pre-compression unit so that a difference between a voltage of the wiring and the voltage of the pre-compression unit is small.

With this configuration, it is possible to reduce the drift more reliably.

In the force detection device according to the aspect of the invention, it is preferable that the conversion output circuit includes a charge amplifier unit and a wiring electrically connecting the force sensor to the charge amplifier unit, and the voltage generation circuit generates a leakage current between the wiring and the pre-compression unit so that a leakage current generated in the conversion output circuit is offset by applying the voltage to the pre-compression unit.

With this configuration, it is possible to reduce the drift more reliably.

A force detection device according to another aspect of the invention includes: a force sensor that has a piezoelectric element receiving a force and outputting a charge; a pre-compression unit that pre-compresses the force sensor; a conversion output circuit that receives the charge from the force sensor and outputs a voltage; and a voltage generation circuit that applies the voltage to the pre-compression unit. The conversion output circuit includes a charge amplifier unit and a wiring electrically connecting the force sensor to the charge amplifier unit. The voltage generation circuit generates a leakage current between the wiring and the pre-compression unit so that a leakage current generated in the conversion output circuit is offset by applying the voltage to the pre-compression unit.

With this configuration, it is possible to obtain the force detection device that reduces a drift and has high force detection characteristics.

In the force detection device according to the aspect of the invention, it is preferable that the pre-compression unit includes first and second base units disposed to interpose the force sensor.

With this configuration, the configuration of the pre-compression is simplified.

In the force detection device according to the aspect of the invention, it is preferable that the conversion output circuit is disposed between the first and second base units.

With this configuration, it is possible to protect the conversion output circuit by the pre-compression unit. A space between the first and second base units can be effectively utilized, and thus it is possible to achieve miniaturization of the force detection device.

A robot according to another aspect of the invention includes the force detection device according to the aspect of the invention.

With this configuration, it is possible to obtain the advantages of the force detection device according to the aspect of the invention, and thus the robot has high reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a force detection device and a robot according to the invention will be described in detail with reference to the appended drawings according to preferred embodiments.

First Embodiment

Figure 1:
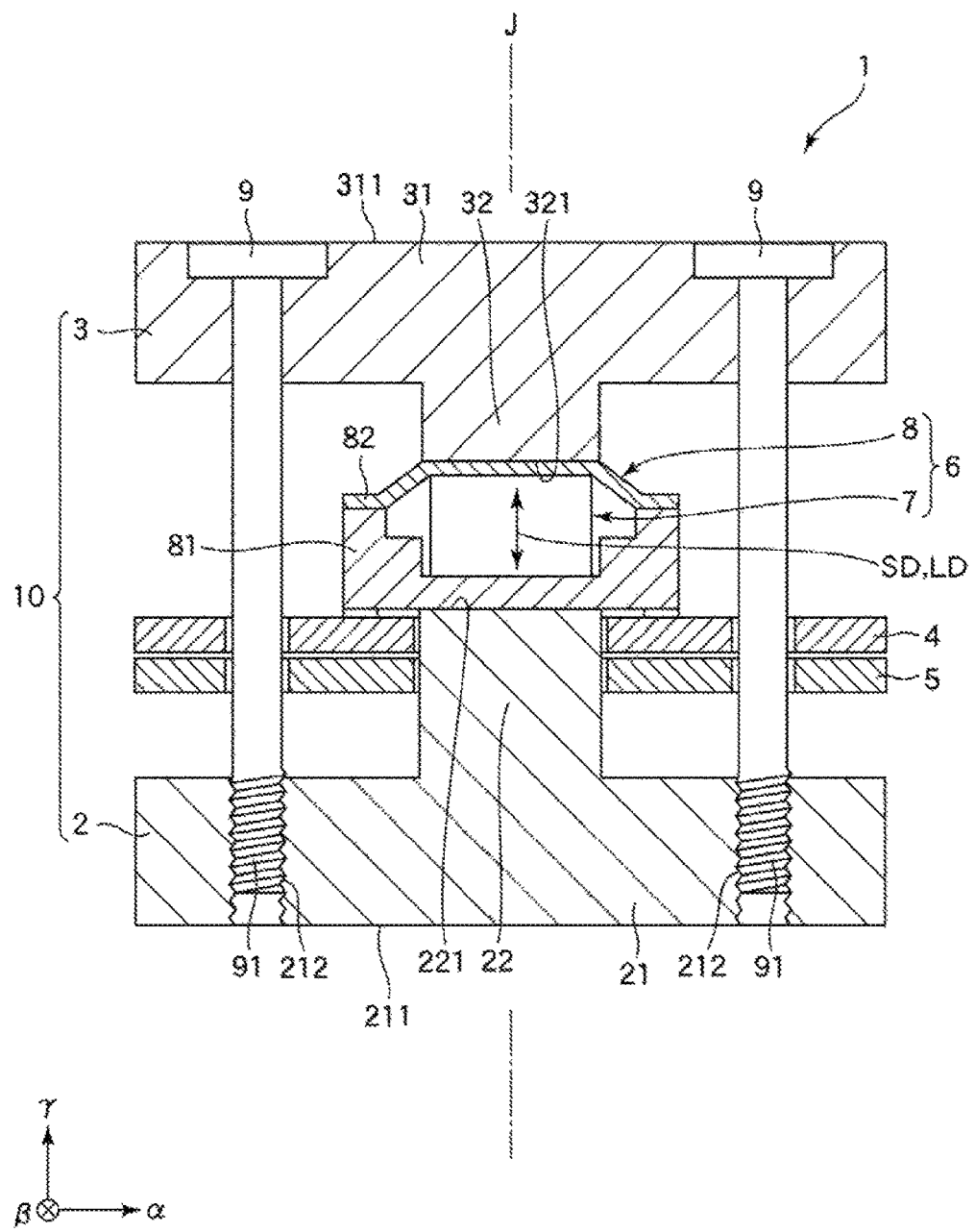
FIG. 1 is a sectional view illustrating a force detection device according to a first embodiment of the invention.
Figure 2:
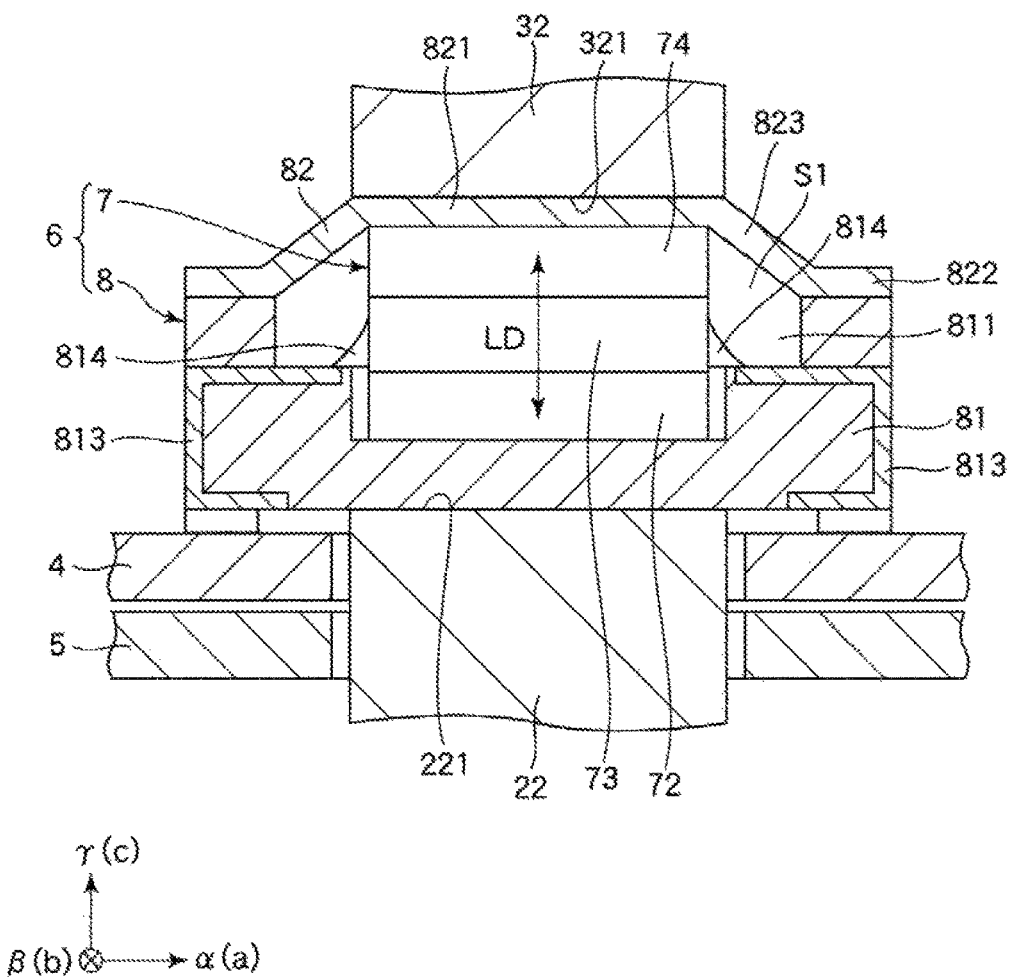
FIG. 2 is an enlarged sectional view illustrating a force sensor included in the force detection device illustrated in FIG. 1.
Figure 3:
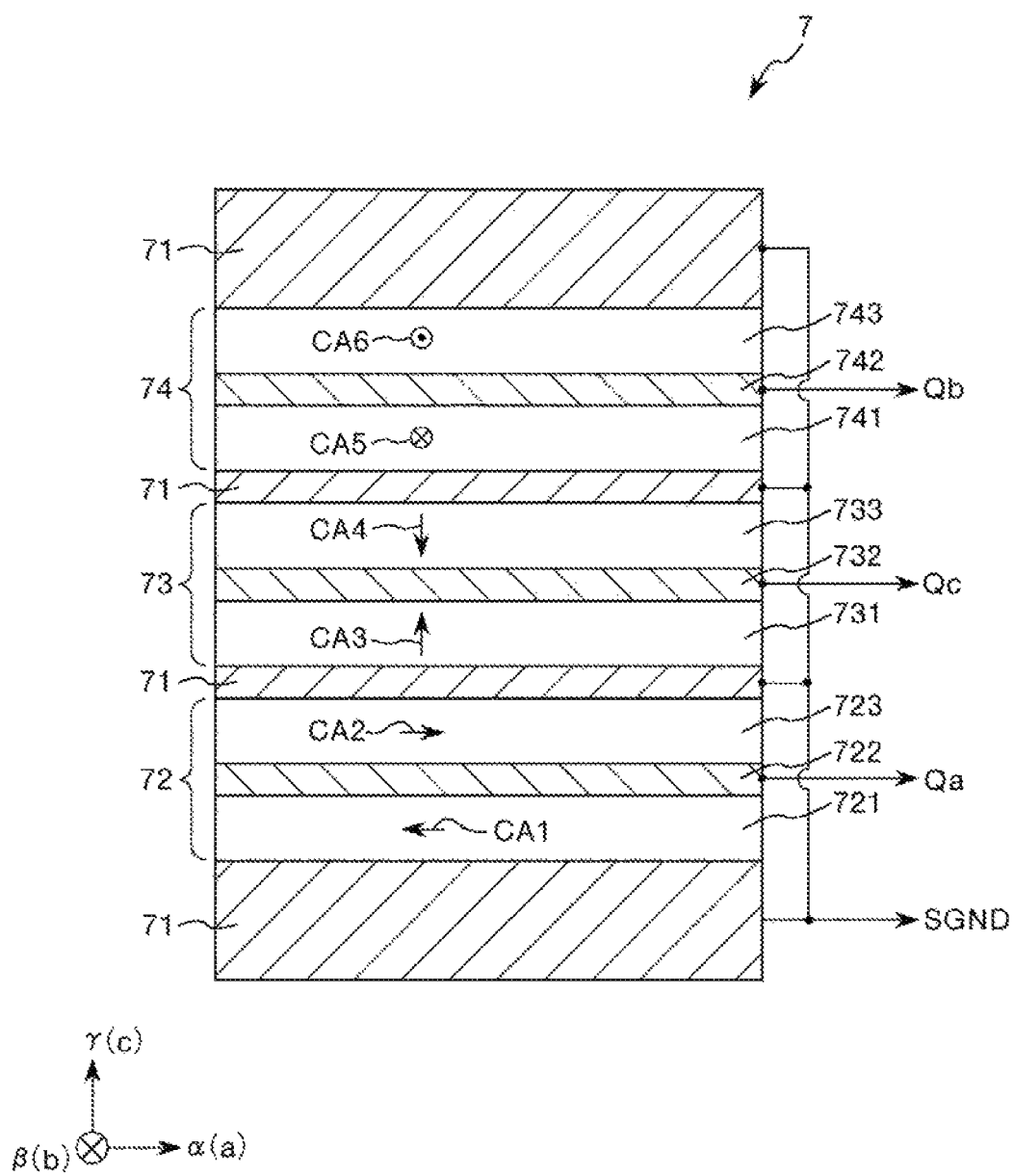
FIG. 3 is a sectional view illustrating a force sensor element included in the force sensor illustrated in FIG. 2.
Figure 4:
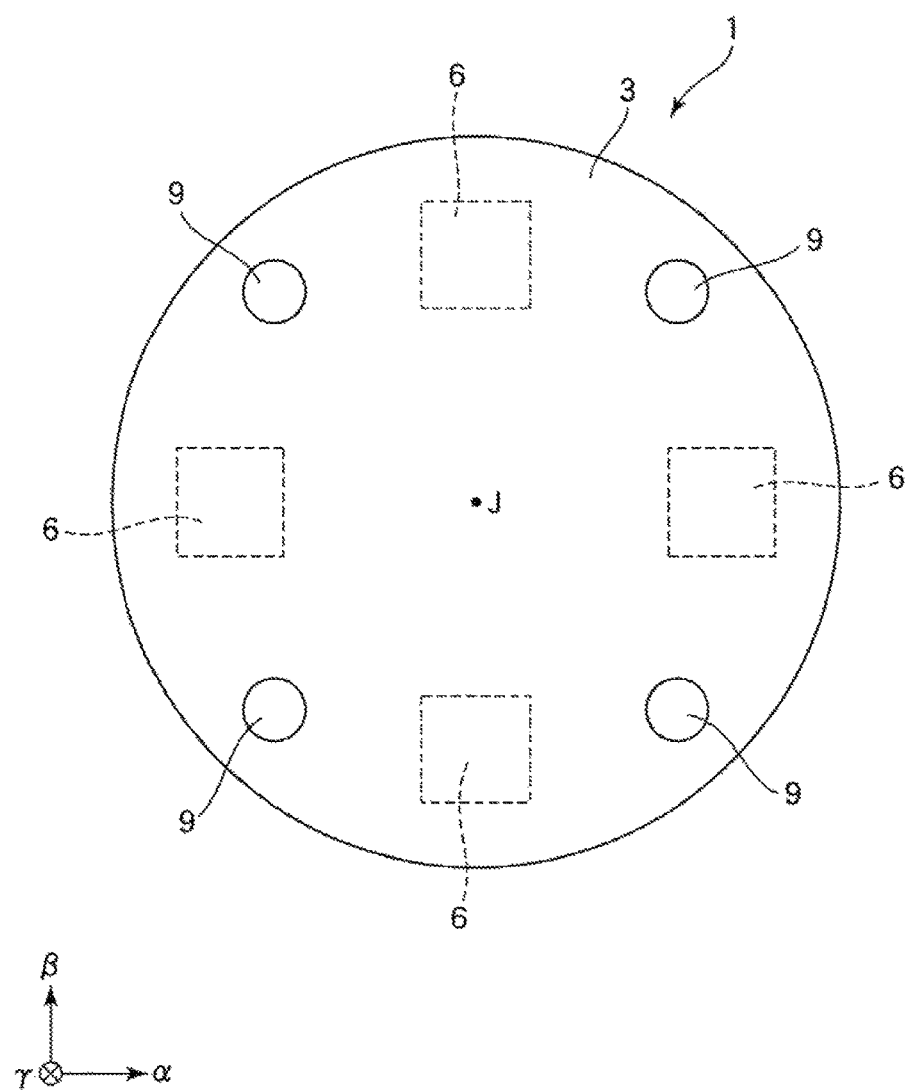
FIG. 4 is a plan view illustrating a modification example of the force detection device illustrated in FIG. 1.
Figure 5:
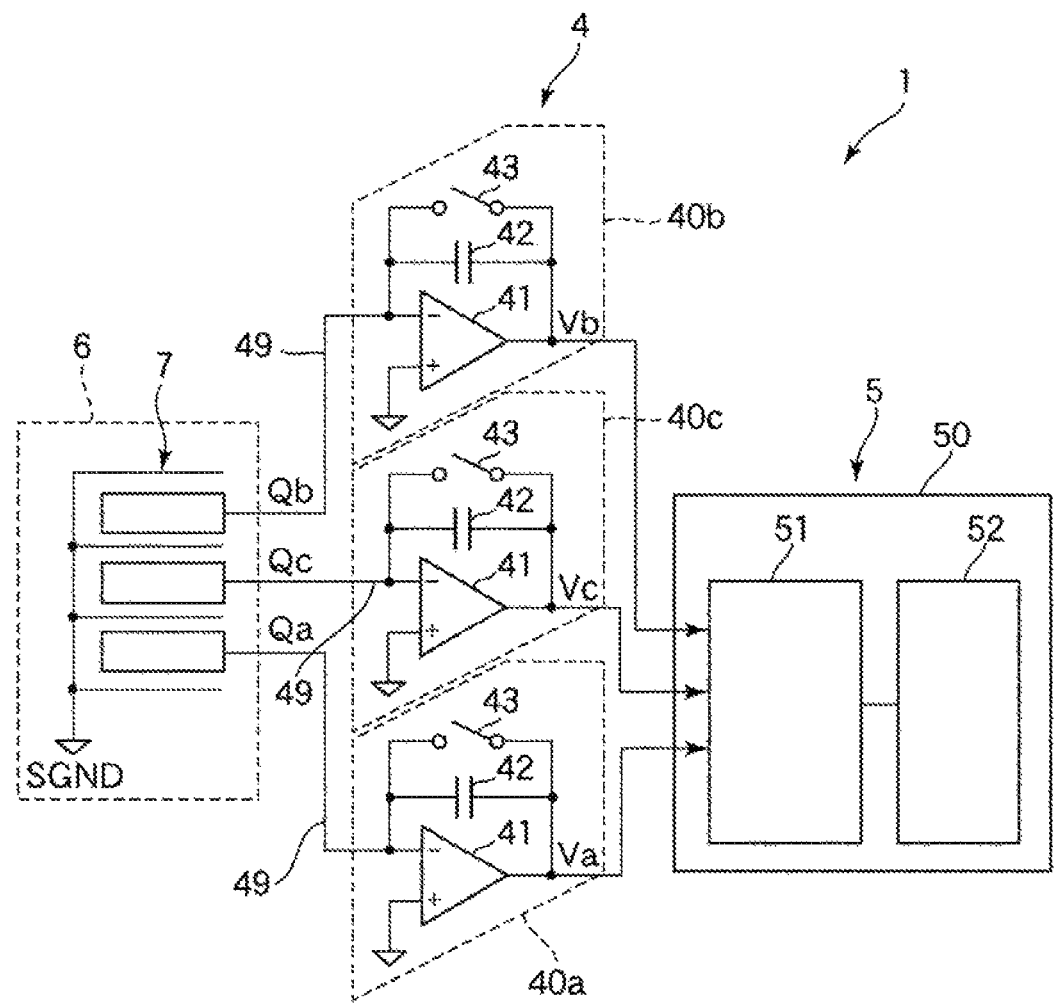
FIG. 5 is a circuit diagram illustrating a circuit system included in the force detection device illustrated in FIG. 1.
Figure 6:
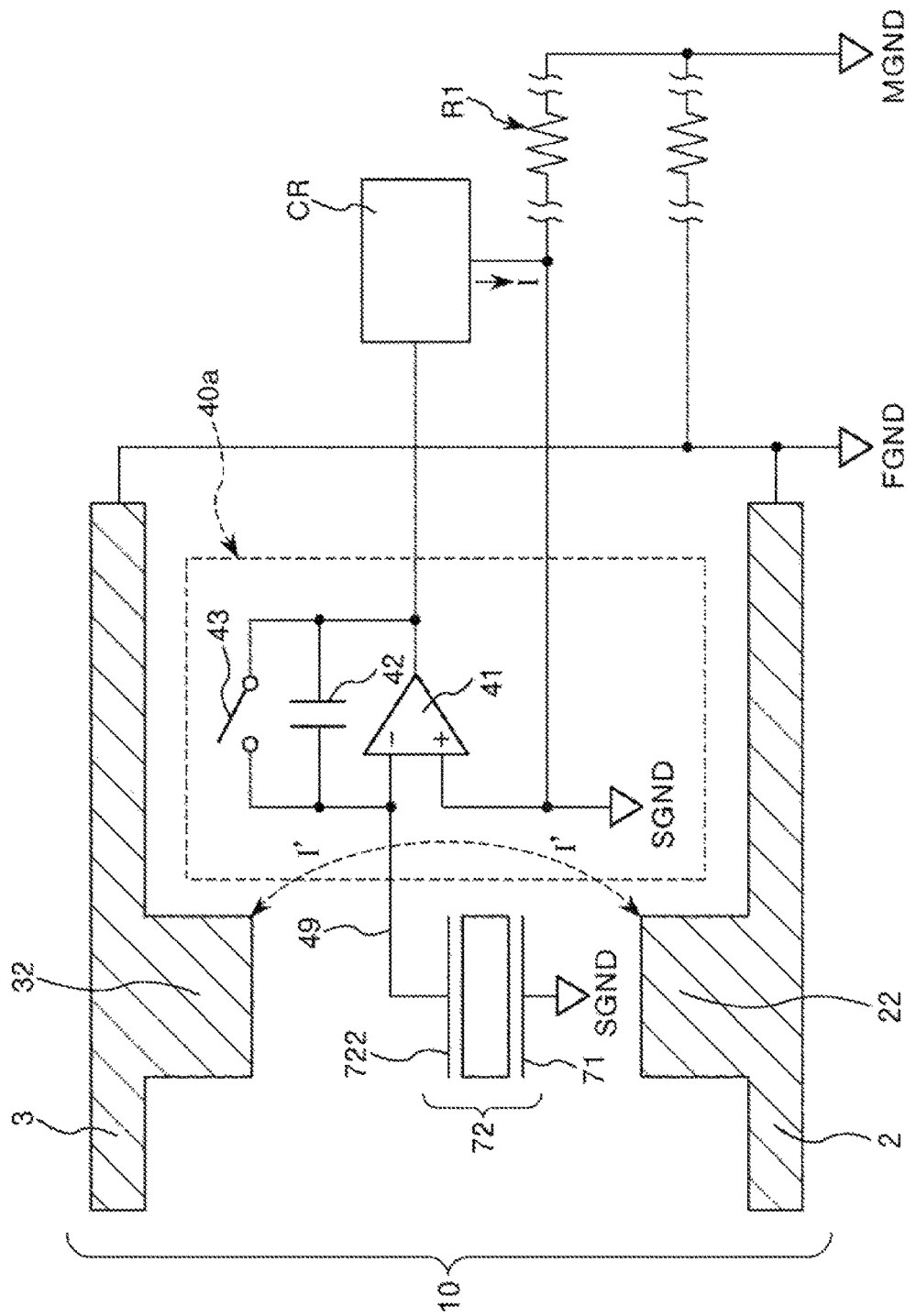
FIG. 6 is a circuit diagram illustrating a circuit system included in a force detection device of the related art.
Figure 7:
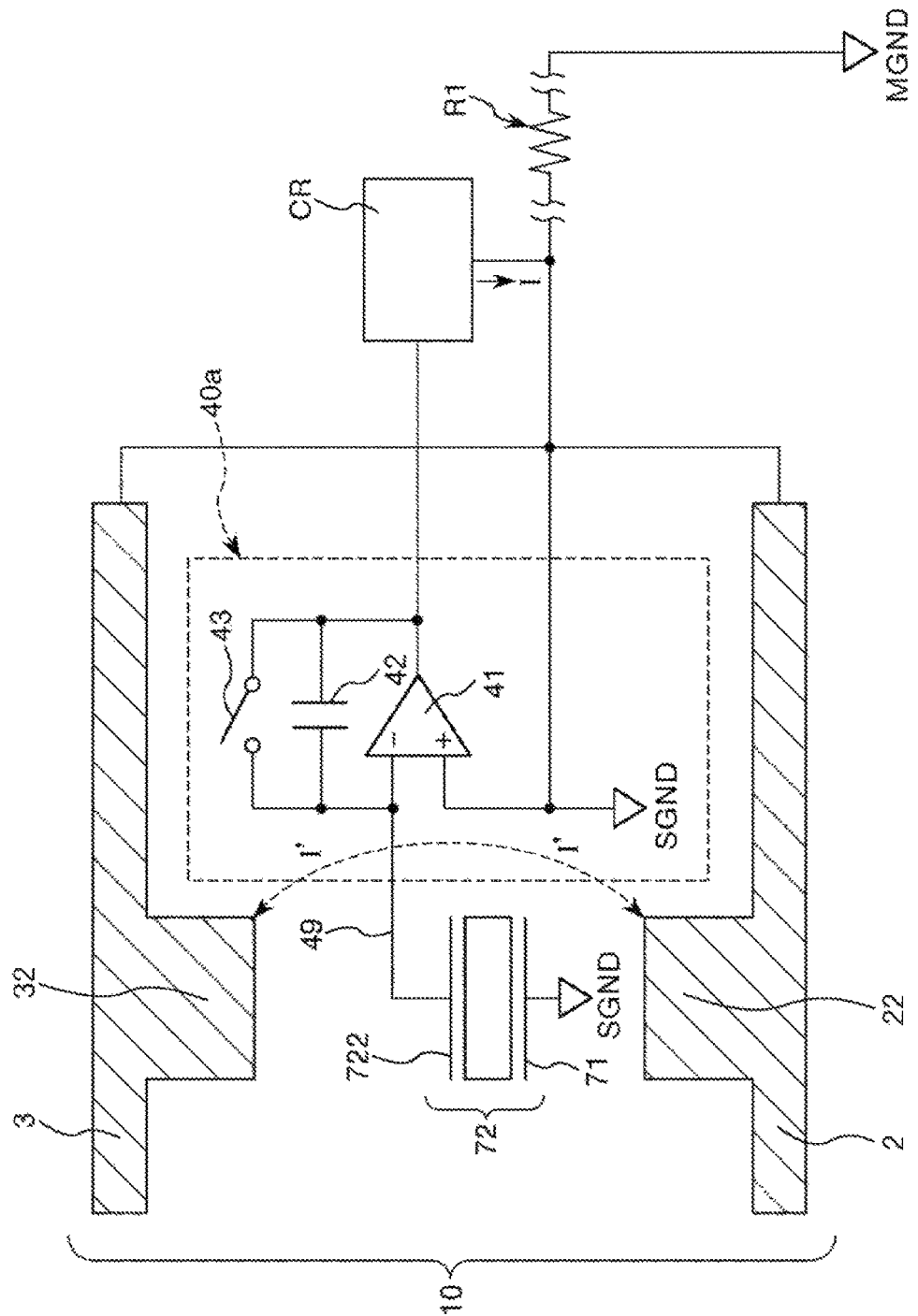
FIG. 7 is a circuit diagram illustrating a circuit system included in the force detection device illustrated in FIG. 1.

FIG. 1 is a sectional view illustrating a force detection device according to a first embodiment of the invention. FIG. 2 is an enlarged sectional view illustrating a force sensor included in the force detection device illustrated in FIG. 1. FIG. 3 is a sectional view illustrating a force sensor element included in the force sensor illustrated in FIG. 2. FIG. 4 is a plan view illustrating a modification example of the force detection device illustrated in FIG. 1. FIG. 5 is a circuit diagram illustrating a circuit system included in the force detection device illustrated in FIG. 1. FIG. 6 is a circuit diagram illustrating a circuit system included in a force detection device of the related art. FIG. 7 is a circuit diagram illustrating a circuit system included in the force detection device illustrated in FIG. 1. Hereinafter, to facilitate description, the upper side is referred to as a "top" and the lower side is referred to as a "bottom" in FIGS. 1 and 2. As illustrated in FIGS. 1 to 4, hereinafter, three axes perpendicular to each other are referred to as $\alpha$, $\beta$, and $\gamma$ axes, a direction parallel to the $\alpha$ axis is referred to as an "$\alpha$ axis direction", a direction parallel to the $\beta$ axis is referred to as a "$\beta$ axis direction", and a direction parallel to the $\gamma$ axis is referred to as a "$\gamma$ axis direction".

A force detection device 1 illustrated in FIG. 1 has a function of detecting an external force (including a moment) and, specifically, a function of detecting an external force added along the perpendicular three axes, the $\alpha$, $\beta$, and $\gamma$ axes. The force detection device 1 includes a first base unit 2, a second base unit 3 disposed to be opposite to the first base unit 2, a force sensor 6 disposed between the first base unit 2 and the second base unit 3, an analog circuit substrate 4 (a circuit substrate), a digital circuit substrate 5, and pre-compression bolts 9 connecting the first base unit 2 to the second base unit 3. In the force detection device 1, the first base unit 2 and the second base unit 3 are disposed to interpose the force sensor 6 and a pre-compression unit 10 pre-compresses the force sensor 6.

The first base unit 2 includes a tabular bottom plate 21 and a projection unit 22 that projects from the middle of the bottom plate 21 to the upper side (the side of the second base unit 3). As will be described below in a fifth embodiment, a bottom surface 211 of the bottom plate 21 serves as a fitting surface (a first fitting surface) for a robot 1000 when the force detection device 1 is fixed to the robot 1000 for use. The shape of the bottom plate 21 in a plan view is a circle. Here, the shape of the bottom plate 21 in the plan view is not particularly limited and is, for example, a polygon such as a triangle or a quadrangle. In the case of the polygon, its corners may be rounded.

A top surface 221 of the projection unit 22 is configured as a flat surface parallel to the bottom surface 211. Here, the direction of the top surface 221 of the projection unit 22 is not particularly limited and may be not parallel to the bottom surface 211.

As illustrated in FIG. 1, the second base unit 3 includes a tabular top plate 31 and a projection unit 32 that projects from the middle of the top plate 31 to the lower side (the side of the first base unit 2). As will be described below in the fifth embodiment, a top surface 311 of the top plate 31 is a fitting surface (a second fitting surface) for the robot 1000 when the force detection device 1 is fixed to the robot 1000 for use. The top surface 311 of the top plate 31 is parallel to the bottom surface 211 of the bottom plate 21 in a natural state in which no external force is applied. Here, the top surface 311 and the bottom surface 211 may be not parallel to each other in the natural state. The shape of the top plate 31 in the plan view is substantially the same as the shape of the bottom plate 21 in the plane view, and thus is a circle. Here, the shape of the top plate 31 in the plan view is not particularly limited and may be, for example, a polygon such as a triangle or a quadrangle. The shape of the top plate 31 in the plan view may be different from the shape of the bottom plate 21 in the plan view.

A top surface 321 of the projection unit 32 is configured as a flat surface parallel to the top surface 311. Here, the direction of the top surface 321 of the projection unit 32 is not particularly limited and may be not parallel to the top surface 311.

The first base unit 2 and the second base unit 3 have been described above. A material of the first base unit 2 and the second base unit 3 is not particularly limited as long as the material has conductivity. In particular, a hard metal material is preferable. Examples of the material include various metals such as iron, nickel, cobalt, gold, platinum, silver, copper, manganese, aluminum, magnesium, zinc, lead, tin, titanium, and tungsten.

Next, the force sensor 6 will be described. As illustrated in FIG. 1, the force sensor 6 is disposed between the projection unit 22 of the first base unit 2 and the projection unit 32 of the second base unit 3. The force sensor 6 has a function of outputting three charges Qa, Qb, and Qc according to an external force applied along perpendicular three axes (a, b, and c axes). As illustrated in FIG. 2, the force sensor 6 includes a force sensor element 7 (a piezoelectric element) and a package 8 that accommodates the force sensor element 7.

As illustrated in FIG. 3, the force sensor element 7 includes four ground electrode layers 71 that are grounded to a signal ground SGND, a first sensor 72 that outputs a charge Qa according to an external force (shearing force) parallel to the a axis, a second sensor 73 that outputs a charge Qc according to an external force (condensing/tensile force) parallel to the c axis, and a third sensor 74 that outputs a charge Qb according to an external force (shearing force) parallel to the b axis. The ground electrode layers 71 and the sensors 72, 73, and 74 are alternately laminated.

The first sensor 72 includes a first piezoelectric substrate 721 that has a first crystal axis CA1 aligned in the negative direction of the a axis, a second piezoelectric substrate 723 that has a second crystal axis CA2 aligned in the positive direction of the a axis, and an output electrode layer 722 that is installed between the first piezoelectric substrate 721 and the second piezoelectric substrate 723 and outputs the charge Qa. The first piezoelectric substrate 721 and the second piezoelectric substrate 723 can be formed of, for example, Y-cut quartz crystal substrates.

The second sensor 73 includes a third piezoelectric substrate 731 that has a third crystal axis CA3 aligned in the positive direction of the c axis, a fourth piezoelectric substrate 733 that has a fourth crystal axis CA4 aligned in the negative direction of the c axis, and an output electrode layer 732 that is installed between the third piezoelectric substrate 731 and the fourth piezoelectric substrate 733 and outputs the charge Qc. The third piezoelectric substrate 731 and the fourth piezoelectric substrate 733 can be formed of, for example, X-cut quartz crystal substrates.

The third sensor 74 includes a fifth piezoelectric substrate 741 that has a fifth crystal axis CA5 aligned in the positive direction of the b axis, a sixth piezoelectric substrate 743 that has a sixth crystal axis CA6 aligned in the negative direction of the b axis, and an output electrode layer 742 that is installed between the fifth piezoelectric substrate 741 and the sixth piezoelectric substrate 743 and outputs the charge Qb. The fifth piezoelectric substrate 741 and the sixth piezoelectric substrate 743 can be formed of, for example, Y-cut quartz crystal substrates. When viewed in the lamination direction of the sensors 72, 73, and 74, each X axis (the electrical axis of quartz crystal) of the first piezoelectric substrate 721 and the second piezoelectric substrate 723 intersects (in the embodiment, is perpendicular to) each X axis (the electric axis of quartz crystal) of the fifth piezoelectric substrate 741 and the sixth piezoelectric substrate 743.

In the force detection device 1, a translational force component in the X axis direction, a translational force component in the Y axis direction, a translational force component in the Z axis direction, a rotational force component around the X axis, a rotational force component around the Y axis, and a rotational force component around the Z axis can be detected based on the charges Qa, Qb, and Qc output from the force sensor element 7.

In this way, the force sensor element 7 includes the piezoelectric substrates 721, 723, 731, 733, 741, and 743. Therefore, the force sensor 6 can detect a received force with high precision. In particular, in the embodiment, a material of each of the piezoelectric substrates 721, 723, 731, 733, 741, and 743 is quartz crystal. Thus, the force sensor 6 can have better temperature characteristics, a higher mechanical strength (rigidity and load bearing), and a higher dynamic range than when another piezoelectric substance is used. Therefore, the received force can be detected in a wider range and with higher precision. Accordingly, the force sensor 6 can have more excellent detection characteristics.

Here, a material of each of the piezoelectric substrates 721, 723, 731, 733, 741, and 743 is not limited to quartz crystal. For example, another piezoelectric substance other than quartz crystal, such as lithium niobate ($LiNbO_3$), lithium tantalate ($LiTaO_3$), lead zirconate titanate (PZT), lithium tetraborate ($Li_2B_4O_7$), langasite ($La_3Ga_5SiO_{14}$), potassium niobate ($KNbO_3$), gallium phosphate ($GaPO_4$), gallium arsenide (GaAs), aluminum nitride (AlN), zinc oxide (ZnO, $Zn_2O_3$), barium titanate ($BaTiO_3$), lead titanate ($PbPO_3$), sodium potassium niobate ($(K,Na)NbO_3$), bismuth ferrite ($BiFeO_3$), sodium niobate ($NaNbO_3$), bismuth titanate ($Bi_4Ti_3O_{12}$), or bismuth sodium titanate ($Na_{0.5}Bi_{0.5}TiO_3$).

As illustrated in FIG. 2, the package 8 includes a base 81 including a recessed portion 811 and a lid 82 joined to the base 81 to cover an opening of the recessed portion 811. An airtight accommodation space S1 is formed inside the package 8 and the force sensor element 7 is accommodated in the accommodation space S1. Atmosphere of the accommodation space S1 is not particularly limited. The accommodation space can be filled with, for example, a rare gas such as nitrogen, argon, helium. Thus, the atmosphere of the accommodation space S1 is stabilized, and thus it is possible to suppress deterioration, erosion, or the like of an electrode. The accommodation space S1 may be in, for example, a depressurized state (preferably, a vacuum state).

A material of the base 81 is not particularly limited. For example, any of various ceramics such as aluminum oxide (alumina) and zirconium oxide (zirconia) can be used. For example, a bottom portion (a portion on which the force sensor element 7 is placed) of the base 81 and a side wall portion (a portion erect from an outer frame of the bottom portion) of the base 81 may be formed of different materials. In this case, for example, the bottom portion can be formed of any of various metal materials such as stainless steel, Kovar, copper, iron, and carbon steel and the side wall portion can be formed of any of various ceramics. For example, as the material of the bottom portion, an alloy of Kovar with a close coefficient of thermal expansion to ceramics is preferable. Thus, thermal strain rarely occurs in the package 8, and thus it is possible to reduce application of unnecessary stress (an external force other than pre-compression and a force to be detected) to the force sensor element 7.

As illustrated in FIG. 2, a terminal 813 connecting the outside and the inside of the accommodation space S1 is formed in the base 81. The terminal 813 is electrically connected to the force sensor element 7 via a connection portion 814. The connection portion 814 is not particularly limited. For example, a conductive paste such as an Ag paste, a Cu paste, or an Au paste can be used.

The lid 82 is located in a central portion and includes a middle portion 821 that is in contact with the force sensor element 7, an outer edge portion 822 that is located in the outer edge and is in contact with the base 81, and a tapered connection portion 823 that is located between the middle portion 821 and the outer edge portion 822 and connects the middle portion 821 to the outer edge portion 822. The middle portion 821 is installed to protrude from the outer edge portion 822.

The material of the lid 82 is not particularly limited and may be a member that has an approximate coefficient of thermal expansion to the material of the base 81. For example, when the above-described ceramic is used as the material of the base 81, the material of the lid 82 is preferably a metal material (for example, an alloy of Kovar or the like). Thus, thermal strain rarely occurs in the package 8, and thus it is possible to reduce application of unnecessary stress (an external force other than pre-compression and a force to be detected) to the force sensor element 7. Therefore, the force detection device 1 has higher force detection precision.

The force sensor 6 has been described above. The configuration of the force sensor 6 is not particularly limited. For example, the package 8 may be omitted. The configuration of the force sensor element 7 is not particularly limited as long as the force sensor element 7 includes piezoelectric elements. For example, the second sensor 73 may be omitted from the force sensor element 7. In the embodiment, the force detection device 1 includes one force sensor 6, but the number of force sensors 6 included in the force detection device 1 is not particularly limited. Two or more force sensors 6 may be used. Specifically, for example, as illustrated in FIG. 4, four force sensors 6 may be disposed at an equal interval around a central axis J of the force detection device in a plan view when viewed in the γ axis direction.

As illustrated in FIG. 1, the force sensor 6 is disposed between the projection unit 22 of the first base unit 2 and the projection unit 32 of the second base unit 3. The force sensor 6 is disposed to be interposed between the projection units 22 and 32 so that the base 81 is oriented toward the projection unit 22 and the lid 82 is oriented toward the projection unit 32. When the lamination direction of the sensors 72, 73, and 74 is a "lamination direction LD", the lamination direction LD matches (is parallel to) the central axis J of the force detection device 1. Here, the lamination direction LD is not particularly limited. The lamination direction LD may be sloped with respect to a maintenance direction SD or may be perpendicular to the maintenance direction SD.

As illustrated in FIG. 1, the first base unit 2 and the second base unit 3 are connected and fixed by the pre-compression bolts 9. The force sensor element 7 is pre-compressed by the pre-compression bolts 9 so that the force sensor element 7 is compressed in the maintenance direction SD (the lamination direction LD). More specifically, head portions of the pre-compression bolts 9 engage with the second base unit 3 and thread portions of the pre-compression bolts 9 are screwed with the first base unit 2 to pre-compress the force sensor element 7. Therefore, by adjusting a fastening amount of the pre-compression bolts 9, it is possible to adjust the magnitude of the pre-compression given to the force sensor element 7. In this way, by pre-compressing the force sensor element 7, an output at the time of applying an external force is stabilized and the applied external force can be detected with high precision. In a state in which the first base unit 2 and the second base unit 3 are fixed by the pre-compression bolts 9, at least one of the first base unit 2 and the second base unit 3 can be displaced with respect to the other within a predetermined range. Thus, it is possible to deliver the received external force to the force sensor element 7 more reliably.

The number of pre-compression bolts 9 is 2. As illustrated in FIG. 1, the pre-compression bolts 9 interpose the force sensor 6 and are disposed on both sides of the force sensor 6. Thus, the pre-compression bolts 9 can pre-compress the force sensor 6 on both sides with good balance.

As illustrated in FIG. 1, female screw portions 212 screwed with thread portions 91 of the pre-compression bolts 9 are installed in the bottom plate 21 of the first base unit 2. Each pre-compression bolt 9 is inserted into the first base unit 2 from the side of the second base unit 3. The thread portion 91 of each pre-compression bolt 9 is screwed with the female screw portion 212 and a pressure with a predetermined magnitude, that is, pre-compression, is applied to the force sensor element 7 in the maintenance direction SD. Thus, when a shearing force is applied to the force sensor element 7, a frictional force occurs between the piezoelectric substrates included in the force sensor element 7 and a charge is reliably output from the force sensor element 7. By adjusting the fastening amount of the pre-compression bolts 9, it is possible to adjust the magnitude of the pre-compression.

A material of the pre-compression bolts 9 is not particularly limited. For example, any of various metal materials and various resin materials can be used. When the pre-compression bolts 9 are formed of a metal material, the first base unit 2 and the second base unit 3 are electrically connected (short-circuited) by the pre-compression bolts 9, and all of the pre-compression bolts 9, the first base unit 2, and the second base unit 3 can have the same potential.

Next, the analog circuit substrate 4 and the digital circuit substrate 5 will be described. As illustrated in FIG. 1, the analog circuit substrate 4 and the digital circuit substrate 5 are disposed between the first base unit 2 and the second base unit 3. In the analog circuit substrate 4 and the digital circuit substrate 5, through holes are disposed so that the through holes avoid and do not interfere with the projection unit 22 and the pre-compression bolts 9. Here, the disposition of the analog circuit substrate 4 and the digital circuit substrate 5 is not particularly limited.

As illustrated in FIG. 5, the analog circuit substrate 4 includes a conversion output circuit 40a (a charge amplifier) that converts the charge Qa output from the force sensor element 7 into a voltage Va, a conversion output circuit 40b (a charge amplifier) that converts the charge Qb output from the force sensor element 7 into a voltage Vb, and a conversion output circuit 40c (a charge amplifier) that converts the charge Qc output from the force sensor element 7 into a voltage Vc. Further, each of the conversion output circuits 40a, 40b, and 40c includes an operational amplifier 41, a capacitor 42, and a switching element 43.

As illustrated in FIG. 5, the digital circuit substrate 5 includes an external force detection circuit 50 that detects an applied external force. The external force detection circuit 50 has a function of detecting an applied external force based on the voltage Va output from the conversion output circuit 40a, the voltage Vb output from the conversion output circuit 40b, and the voltage Vc output from the conversion output circuit 40c. The external force detection circuit 50 includes an AD converter 51 connected to the conversion output circuits 40a, 40b, and 40c and an arithmetic unit 52 (an arithmetic circuit) connected to the AD converter 51.

The AD converter 51 has a function of converting the voltages Va, Vb, and Vc from analog signals to digital signals. Then, the voltages Va, Vb, and Vc converted digitally by the AD converter 51 are input to the arithmetic unit 52. The arithmetic unit 52 detects the translational force component in the α axis direction, the translational force component in the β axis direction, the translational force component in the γ axis direction, the rotational force component around the α axis, the rotational force component around the β axis, and the rotational force component around the γ axis based on the digitally converted voltages Va, Vb, and Vc.

As the conversion output circuits 40a, 40b, and 40c will be described below in detail, the conversion output circuits 40a, 40b, and 40c are the same. Thus, the conversion output circuit 40a will be described representatively and the description of the conversion output circuits 40b and 40c will be omitted.

The conversion output circuit 40a has a function of converting the charge Qa output from the force sensor element 7 into the voltage Va and outputting the voltage Va. As described above, the conversion output circuit 40a includes the operational amplifier 41, the capacitor 42, and the switching element 43. An inverted input terminal (a negative input) of the operational amplifier 41 is connected to the output electrode layer 722 of the force sensor element 7 via the input wiring 49 and the charge Qa from the force sensor 6 flows to the inverted input terminal. On the other hand, a non-inverted input terminal (a positive input) is connected to the signal ground SGND (a first ground) which has a reference potential of the conversion output circuit 40a. An output terminal of the operational amplifier 41 is connected to the external force detection circuit 50.

The capacitor 42 is connected between a first inverted input terminal and the output terminal of the operational amplifier 41. The switching element 43 is connected between the inverted input terminal and the output terminal of the operational amplifier 41 and is connected to the capacitor 42 in parallel. The switching element 43 is connected to a driving circuit (not illustrated) and operates according to an on/off signal from the driving circuit. When the switching element 43 is turned off, the charge Qa output from the force sensor element 7 is stored in the capacitor 42 and the voltage Va obtained with a voltage of the capacitor 42 (that is, a quotient value of the charge by capacitance of the capacitor 42) is output to the external force detection circuit 50. Conversely, when the switching element 43 is turned on, both terminals of the capacitor 42 are short-circuited, the charge Qa stored in the capacitor 42 is discharged to become 0 coulomb, and the voltage Va to be output to the external force detection circuit 50 becomes 0 volts. In this way, by turning the switching element 43 on, it is possible to reset the conversion output circuit 40a. Thus, it is possible to reduce an influence by a drift. The voltage Va to be output from the conversion output circuit 40a is ideally proportional to a storage amount of the charge Qa to be output from the force sensor element 7.

Here, in the related art, as illustrated in FIG. 6, in order to shield disturbance noise, the pre-compression unit 10 (the first base unit 2 and the second base unit 3) is connected to a frame ground FGND (a second ground) that has a reference potential. The signal ground SGND (the first ground) and the frame ground FGND are connected via a main ground MGND (a third ground) so that the disturbance noise flowing in the frame ground FGND does not directly propagate to the signal ground SGND.

Here, when an operational current I of a different circuit CR (for example, the above-described AD converter 51) from the conversion output circuit 40a steadily flows in a resistor R1 (a wiring resistor or a contact resistor of a connector) located between the signal ground SGND and the main ground MGND, the signal ground SGND has a higher potential (for example, about several mV to tens of mV) than the main ground MGND. On the other hand, a minute current merely flows at the moment at which disturbance noise flows between the frame ground FGND and the main ground MGND, and a steady current is almost 0 (zero). Therefore, the frame ground FGND has the same potential as the main ground MGND.

The input wiring 49 and the pre-compression unit 10 are isolated from each other. However, insulation resistance is not infinite and is typically equal to or greater than about $10^9 \Omega$ and equal to or less than about $10^{12} \Omega$, which differs depending on an environmental temperature. Therefore, as described above, when the signal ground SGND has a higher potential than the frame ground FGND, for example, a leakage current I' equal to or greater than about $10^{-12}$ A and equal to or less than $10^{-15}$ A may start flowing steadily from the input wiring 49 to the frame ground FGND.

Then, since the flowing leakage current I' is amplified and output by the conversion output circuit 40a, a drift may occur. Thus, it is difficult to detect the received force with high precision. Since the insulation resistance between the input wiring 49 and the pre-compression unit 10 varies depending on the environmental temperature, the degree of drift differs depending on the environmental temperature. Thus, excellent temperature characteristics may not be achieved. In order to maintain high force detection precision, it is necessary to frequently turn on and reset the switching element 43. Thus, the force detection device 1 may not be used continuously for a long time.

With regard to this problem, in the force detection device 1 according to the embodiment, the pre-compression unit 10 is connected to the signal ground SGND (the first ground), as illustrated in FIG. 7. That is, the pre-compression unit 10 and the signal ground SGND are short-circuited. Thus, each compression unit 10 becomes 0 V with respect to the signal ground SGND serving as a reference. A potential difference between the input wiring 49 and the pre-compression unit 10 is substantially 0 (zero), the leakage current I' from the input wiring 49 to the frame ground FGND is reduced, and thus the drift occurring in a configuration of the related art described above is suppressed. Accordingly, the force detection device 1 can detect the received force with high precision. In such a configuration, since the potential difference between the input wiring 49 and the pre-compression unit 10 can be maintained to be substantially 0 (zero) without receiving an influence of an environmental temperature, the excellent temperature characteristics can be achieved. Since a reset interval can be lengthened compared to the configuration of the related art, the force detection device 1 can be used continuously for a long time.

In the embodiment, the first base unit 2 and the second base unit 3 included in the pre-compression unit 10 are each connected to the signal ground SGND. At least part of the pre-compression unit 10 may be connected to the signal ground SGND. For example, one of the first base unit 2 and the second base unit 3 may be connected to the signal ground SGND.

The force detection device 1 according to the embodiment has been described above. As described above, the force detection device 1 includes the force sensor 6 that includes the force sensor element 7 (the piezoelectric element) receiving a force and outputting a charge, the pre-compression unit 10 that pre-compresses the force sensor 6, and the conversion output circuit 40a that receives the charge Qa from the force sensor 6 and outputs the voltage Va. Then, the potential of the pre-compression unit 10 becomes the same as the positional of the signal ground SGND (the first ground) from which the conversion output circuit 40a is short-circuited. That is, the pre-compression unit 10 is short-circuited with the signal ground SGND (the first ground). Thus, it is possible to prevent the leakage current I' from starting steadily flowing from the input wiring 49 connecting the force sensor 6 to the conversion output circuit 40a to the pre-compression unit 10. Therefore, the drift can be reduced, and thus the force detection device 1 can detect the received force with high precision. In such a configuration, the force detection device 1 can achieve excellent temperature characteristics since the environmental temperature is rarely influenced. Since the reset interval can be further lengthened than in the configuration of the related art, the force detection device 1 can be used continuously for a long time.

As described above, in the force detection device 1, the pre-compression unit 10 is short-circuited with the signal ground SGND (the first ground). Thus, the signal ground SGND and the pre-compression unit 10 can have the same potential with the simple configuration. The pre-compression unit 10 has the same potential as the signal ground SGND. Thus, the drift can be further reduced, and thus the force detection device 1 can detect the received force with high precision.

As described above, the pre-compression unit 10 includes the first base unit 2 and the second base unit 3 interposing the force sensor 6. Thus, the force sensor 6 can be pre-compressed with the simple configuration.

As described above, the analog circuit substrate 4 (the conversion output circuit 40a) and the digital circuit substrate 5 (the external force detection circuit 50) are disposed between the first base unit 2 and the second base unit 3. Thus, the analog circuit substrate 4 and the digital circuit substrate 5 can be protected by the first base unit 2 and the second base unit 3. Since a space between the first base unit 2 and the second base unit 3 can be effectively utilized, it is possible to miniaturize the force detection device 1.

Second Embodiment

Figure 8:
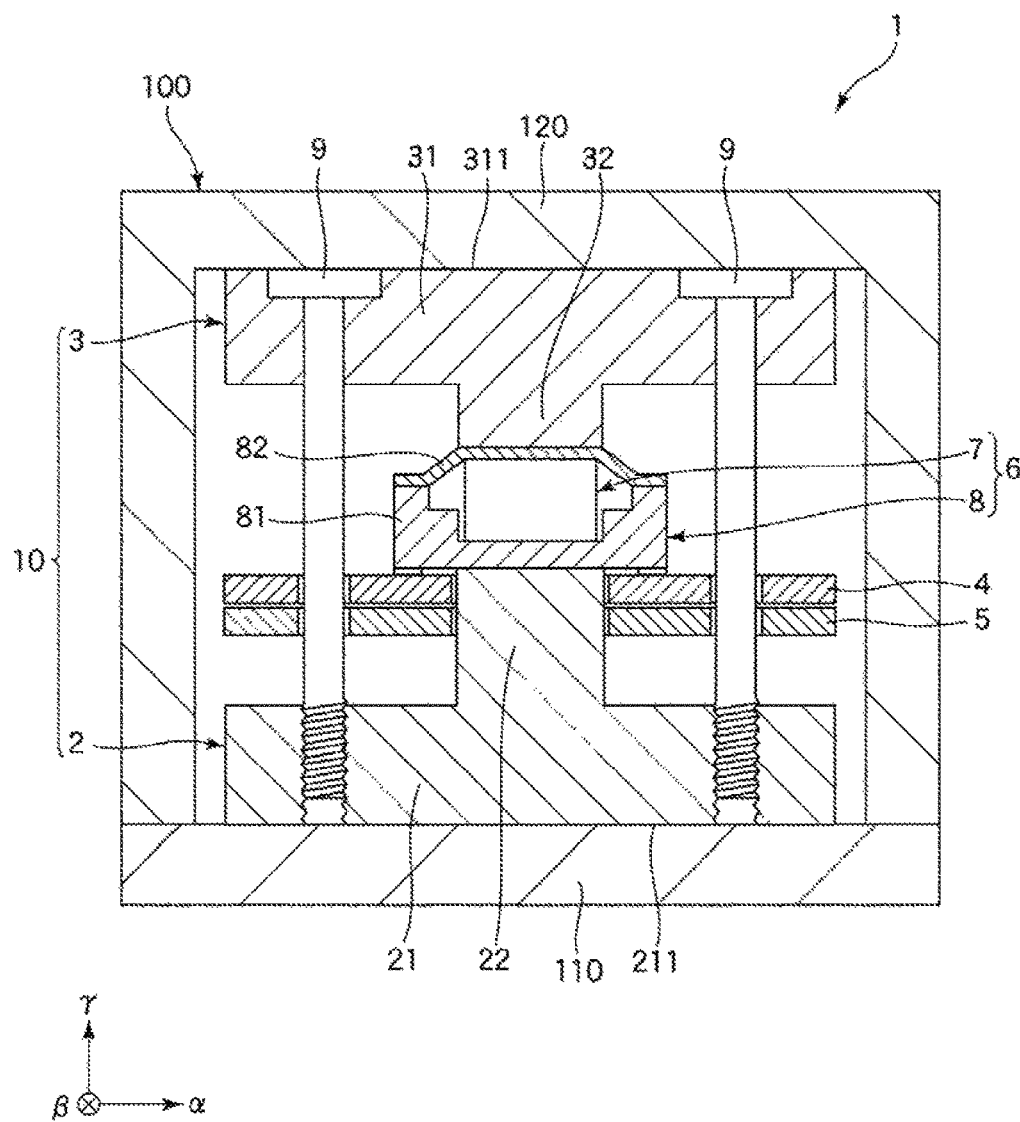
FIG. 8 is a sectional view illustrating a force detection device according to a second embodiment of the invention.
Figure 9:
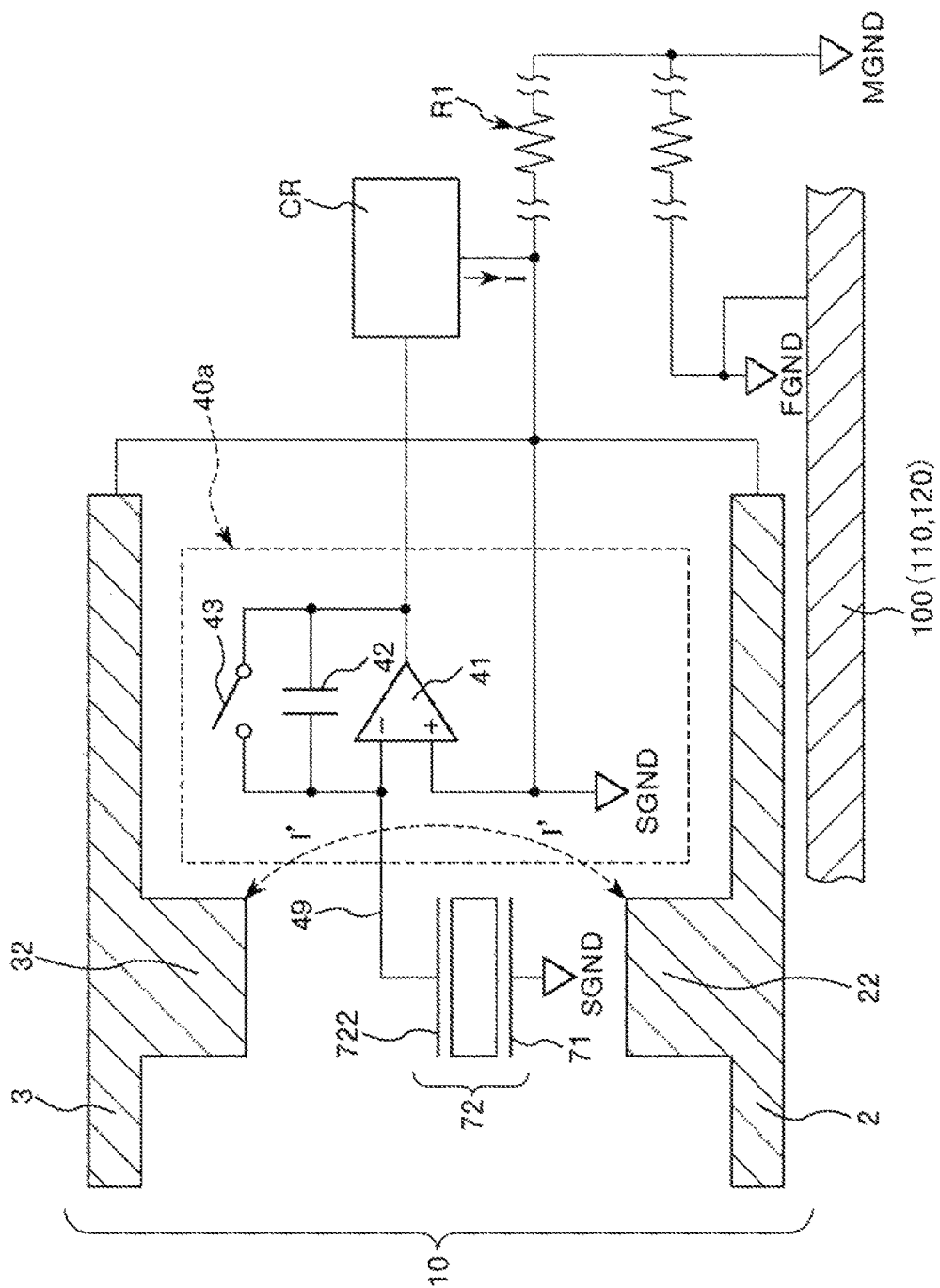
FIG. 9 is a circuit diagram illustrating a circuit system included in the force detection device illustrated in FIG. 8.

FIG. 8 is a sectional view illustrating a force detection device according to a second embodiment of the invention. FIG. 9 is a circuit diagram illustrating a circuit system included in the force detection device illustrated in FIG. 8.

A force detection device 1 according to the embodiment has the same as the force detection device 1 according to the above-described first embodiment except that a casing 100 is included.

In the following description, differences between the force detection devices according to the second embodiment and the above-described first embodiment will be mainly described and the description of the same factors will be omitted.

As illustrated in FIG. 8, the force detection device 1 according to the embodiment includes the casing 100 that accommodates the pre-compression unit 10, the force sensor 6, the analog circuit substrate 4, and the digital circuit substrate 5. The casing 100 includes a base 110 and a cover 120. Here, the cover 120 functions as a lid body or a cover body. The base 110 is screwed to be fixed to the bottom surface 211 of the first base unit 2 in an insulated state (with an insulation layer (not illustrated) interposed therebetween). The cover 120 is screwed to be fixed to the top surface 311 of the second base unit 3 in an insulated state (with an insulation layer (not illustrated) interposed therebetween). That is, the pre-compression unit 10 is accommodated inside the package 100 in the state insulated from the package 100. The base 110 and the cover 120 are installed so that delivery of an external force to the force sensor 6 is not interrupted. By installing the casing 100, it is possible to protect the force sensor 6, the analog circuit substrate 4, and the digital circuit substrate 5.

A material of each of the base 110 and the cover 120 is not particularly limited. A material with conductivity is preferable. For example, examples of the material include various metals such as iron, nickel, cobalt, gold, platinum, silver, copper, manganese, aluminum, magnesium, zinc, lead, tin, titanium, and tungsten.

The configuration of the casing 100 is not particularly limited. For example, the base 110 may be installed to be integrated with the first base unit 2. In other words, the first base unit 2 may also serve as the base 110. For example, the cover 120 may be installed to be integrated with the second base unit 3. In other words, the second base unit 3 may serve as the cover 120.

As illustrated in FIG. 9, the casing 100 is connected to the frame ground FGND (the second ground) that has a reference potential. Thus, disturbance noise can be blocked (reduced) by the casing 100. Therefore, the force detection device 1 can detect a received force with higher precision. The signal ground SGND and the frame ground FGND are connected via the main ground MGND. Therefore, it is possible to prevent disturbance noise flowing in the frame ground FGND from propagating to the signal ground SGND.

The force detection device 1 according to the embodiment has been described above. As described above, the force detection device 1 includes the casing 100 that accommodates the force sensor 6 and the conversion output circuits 40a, 40b, and 40c (the analog circuit substrate 4). The casing 100 is electrically connected (short-circuited) with the frame ground FGND (the second ground). Since the frame ground FGND is a different ground from the signal ground SGND, the casing 100 can block (reduce) disturbance noise which is likely to propagate to the pre-compression unit 10. Thus, the force detection device 1 can detect a received force with higher precision.

Even in the second embodiment, it is possible to achieve the same advantages as those of the above-described first embodiment.

Third Embodiment

Figure 10:
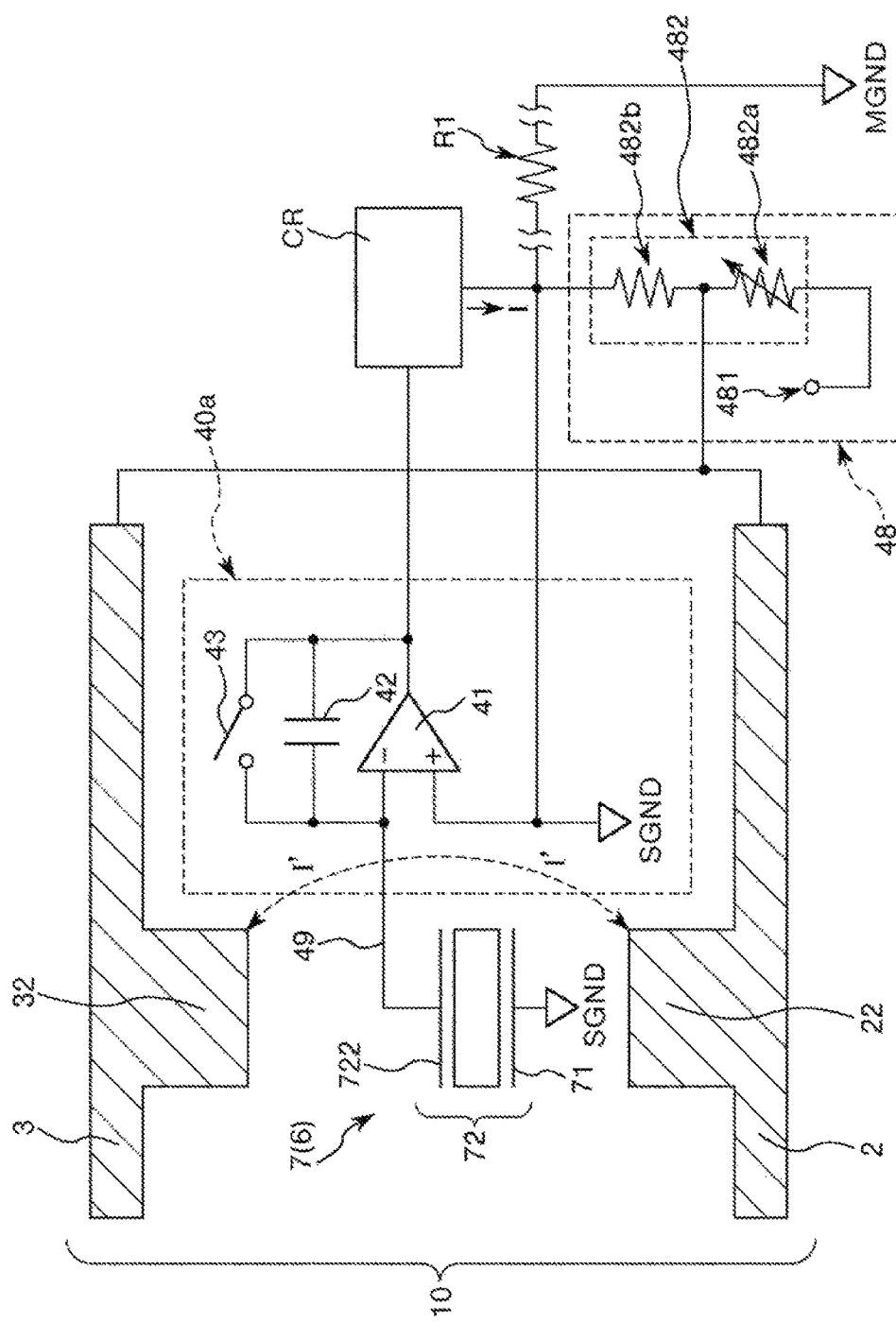
FIG. 10 is a circuit diagram illustrating a circuit system included in a force detection device according to a third embodiment of the invention.

FIG. 10 is a circuit diagram illustrating a circuit system included in a force detection device according to a third embodiment of the invention.

A force detection device 1 according to the embodiment has the same as the force detection device 1 according to the above-described first embodiment except that a method of causing the input wiring 49 and the pre-compression unit 10 to have the same potential is different.

In the following description, differences between the force detection devices according to the third embodiment and the above-described first embodiment will be mainly described and the description of the same factors will be omitted.

As illustrated in FIG. 10, the force detection device 1 according to the embodiment includes a voltage generation circuit 48 disposed in the analog circuit substrate 4. The signal ground SGND (the first ground) and the pre-compression unit 10 are electrically connected via the voltage generation circuit 48. Therefore, in the force detection device 1 according to the embodiment, a voltage with any magnitude generated by the voltage generation circuit 48 is applied to the pre-compression unit 10.

The voltage generation circuit 48 includes a voltage source 481 and an attenuation circuit 482 that attenuates a voltage supplied from the voltage source 481. A positive voltage is supplied from the voltage source 481. The attenuation circuit 482 is a circuit that attenuates a voltage at a predetermined attenuation factor and includes two resistant elements 482a and 482b connected in series. One end of the attenuation circuit 482 is connected to the voltage source 481 and the other end thereof is connected to the signal ground SGND. In the attenuation circuit 482, when Ra is resistance of the resistant element 482a and Rb is resistance of the resistant element 482b, a voltage can be attenuated at an attenuation factor of Rb/(Ra+Rb). In the embodiment, a variable resistor capable of varying a resistant value is used as the resistant element 482a. Therefore, by adjusting the resistant value of the resistant element 482a, it is possible to control the magnitude of the voltage to be applied to the pre-compression unit 10.

In the above-described first embodiment, the potential difference between the input wiring 49 and the pre-compression unit 10 is substantially 0 (zero) by short-circuiting the pre-compression unit 10 and the signal ground SGND. However, more specifically, a voltage of the input wiring 49 deviates slightly (for example, less than about ±hundreds of μV) from a voltage of the signal ground SGND. This deviation is, for example, deviation that depends on an input offset voltage, a gain, and an output voltage of the operational amplifier 41. Therefore, even when the pre-compression unit 10 and the signal ground SGND are short-circuited, a potential difference between the input wiring 49 and the pre-compression unit 10 slightly deviate from each other.

Accordingly, in the embodiment, the voltage generation circuit 48 is used to apply a voltage with a predetermined magnitude to the pre-compression unit 10 so that the potential difference between the input wiring 49 and the pre-compression unit 10 disappears (is further reduced). In other words, the voltage generation circuit 48 is used to correct the magnitude of the voltage to be applied to the first base unit 2 and the second base unit 3. Thus, the potential difference between the input wiring 49 and the pre-compression unit 10 can be further decreased, and thus it is possible to more effectively reduce the leakage current I' flowing from the input wiring 49 to the pre-compression unit 10. Therefore, it is possible to more effectively suppress the drift, and thus the force detection device 1 can detect a received force with higher precision.

For example, a deviation of the voltage of the input wiring 49 from the signal ground SGND may be measured in advance based on the measured deviation and the magnitude of the voltage (that is, a resistant value of the resistant element 482a) to be applied to the first base unit 2 and the second base unit 3 may be determined. Alternatively, the resistant value of the resistant element 482a may be gradually changed while measuring the voltage Va output from the conversion output circuit 40a and the resistant value of the resistant element 482a may be fixed in a state in which the drift decreases.

In the embodiment, the voltage generation circuit 48 is disposed in the analog circuit substrate 4. In this way, a voltage can be adjusted in the pre-compression unit 10 and each of the conversion output circuits 40a, 40b, and 40c. Therefore, it is possible to suppress the drift for each of the conversion output circuits 40a, 40b, and 40c. The voltage generation circuit 48 may be disposed in the digital circuit substrate 5. Since one voltage generation circuit 48 can correspond to the plurality of conversion output circuits 40a, 40b, and 40c, it is possible to miniaturize the force detection device 1. Thus, it is easier to adjust the voltage. The voltage generation circuit 48 may be disposed at a position different from the analog circuit substrate 4 and the digital circuit substrate 5. In this case, a voltage to be applied to the first base unit 2 and the second base unit 3 may be set with reference to the main ground MGND serving as a reference. Thus, it is possible to prevent disturbance noise from flowing in the signal ground SGND.

The force detection device 1 according to the embodiment has been described above. As described above, the force detection device 1 includes the force sensor 6 that includes the force sensor element 7 (the piezoelectric element) receiving a force and outputting a charge, the pre-compression unit 10 that pre-compresses the force sensor 6, the conversion output circuit 40a that receives the charge Qa from the force sensor 6 and outputs the voltage Va, and the voltage generation circuit 48 that applies the voltage to the pre-compression unit 10. Thus, the potential difference between the input wiring 49 and the pre-compression unit 10 can be further decreased, and thus it is possible to prevent the leakage current I' from starting steadily flowing from the input wiring 49 to the pre-compression unit 10. Therefore, it is possible to more effectively reduce the drift, and thus the force detection device 1 can detect a received force with higher precision. In such a configuration, the force detection device 1 can achieve excellent temperature characteristics since the environmental temperature is rarely influenced. Since the reset interval can be further lengthened than in the configuration of the related art, the force detection device 1 can be used continuously for a long time.

As described above, the voltage generation circuit 48 includes the voltage source 481 and the attenuation circuit 482 that drops (attenuates) the voltage of the voltage source 481. Thus, it is easy to apply a feeble voltage to the pre-compression unit 10. Therefore, it is possible to further decrease the potential difference between the input wiring 49 and the pre-compression unit 10 with high precision.

In the embodiment, the attenuation circuit 482 of the voltage generation circuit 48 is used to apply the voltage with the predetermined magnitude to the pre-compression unit 10 so that the potential difference between the input wiring 49 and the pre-compression unit 10 disappears. A stepdown power circuit using an amplification circuit, a reference voltage generation circuit using a band gap reference or a Zener diode, or an independent external power supply may be used.

As described above, the conversion output circuit 40a includes the operational amplifier 41 (a charge amplifier unit) and the input wiring 49 (wiring) that electrically connects the force sensor 6 to the operational amplifier 41. The voltage generation circuit 48 applies a voltage to the pre-compression unit 10 so that a difference between the voltage of the input wiring 49 and the voltage of the pre-compression unit 10 is decreased. Thus, it is possible to further decrease the potential difference between the input wiring 49 and the pre-compression unit 10 more reliably.

Even in the third embodiment, it is possible to achieve the same advantages as those of the above-described first embodiment.

Fourth Embodiment

Figure 11:
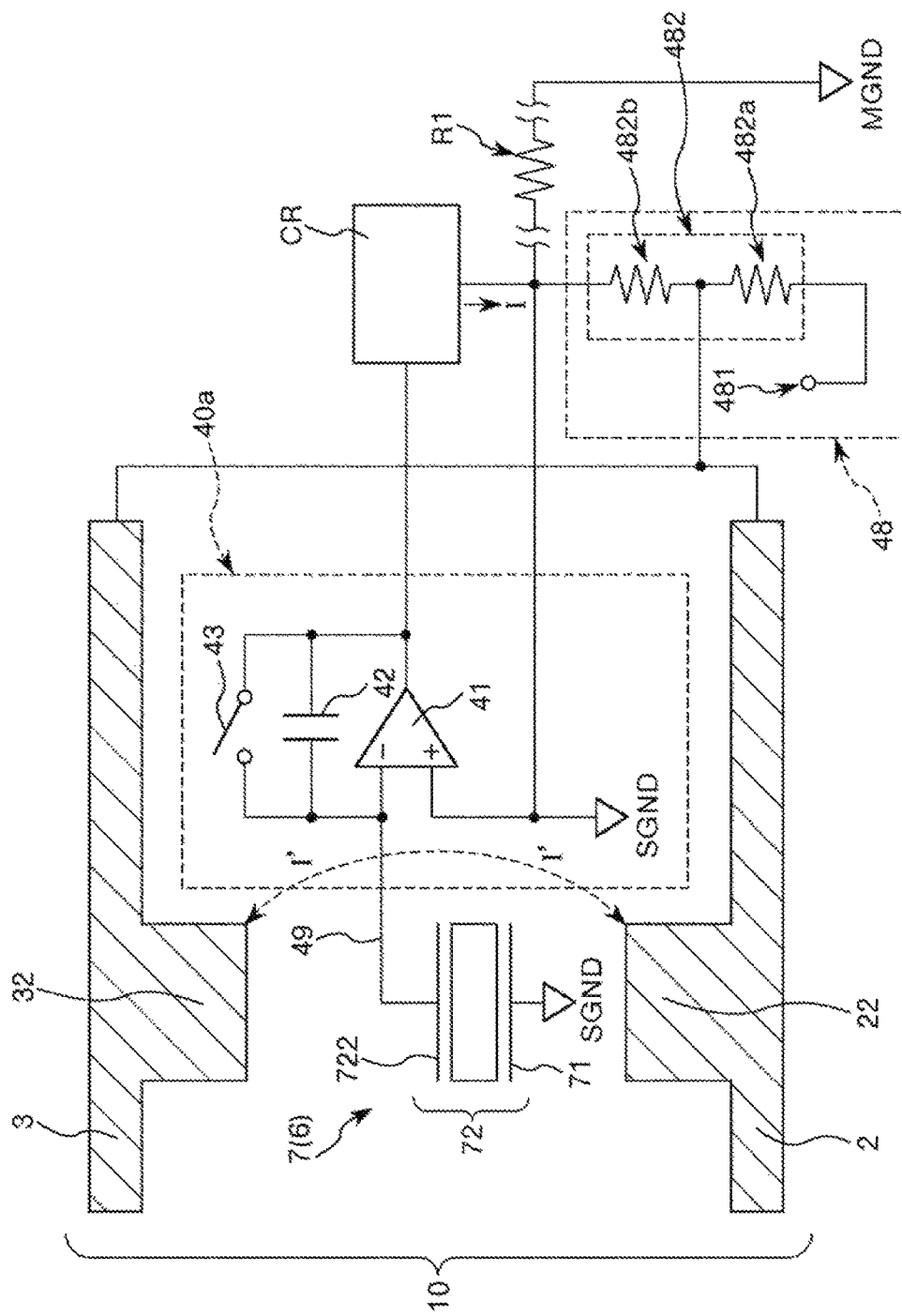
FIG. 11 is a circuit diagram illustrating a circuit system included in a force detection device according to a fourth embodiment of the invention.

FIG. 11 is a circuit diagram illustrating a circuit system included in a force detection device according to a fourth embodiment of the invention.

A force detection device 1 according to the embodiment has the same as the force detection device 1 according to the above-described first embodiment except that the input wiring 49 is caused not to have the same potential as the pre-compression unit 10.

In the following description, differences between the force detection devices according to the fourth embodiment and the above-described first embodiment will be mainly described and the description of the same factors will be omitted.

As illustrated in FIG. 11, the force detection device 1 according to the embodiment includes the voltage generation circuit 48. The signal ground SGND and the pre-compression unit 10 are electrically connected via the voltage generation circuit 48. Therefore, in the force detection device 1 according to the embodiment, a voltage with any magnitude generated by the voltage generation circuit 48 is applied to the pre-compression unit 10.

The voltage generation circuit 48 includes a voltage source 481 and an attenuation circuit 482 that attenuates a voltage supplied from the voltage source 481. The attenuation circuit 482 is a circuit that attenuates a voltage at a predetermined attenuation factor and includes two resistant elements 482a and 482b connected in series. One end of the attenuation circuit 482 is connected to the voltage source 481 and the other end thereof is connected to the signal ground SGND. In the embodiment, unlike the above-described third embodiment, both the resistant elements 482a and 482b are fixed resistors. By controlling (adjusting) the magnitude of the voltage to be supplied from the voltage source 481 instead, it is possible to control the magnitude of the voltage to be applied to the pre-compression unit 10.

In the above-described first embodiment, the leakage current I' from the input wiring 49 to the frame ground FGND is reduced by short-circuiting the pre-compression unit 10 and the signal ground SGND. The leakage current I' occurs not only in this route but also in the inside of the conversion output circuit 40a in some cases. An example of the leakage current I' includes a leakage current flowing in a route to a positive supply or a negative supply of the switching element 43 or the operational amplifier 41 included in the conversion output circuit 40a. Therefore, even when the leakage current I' from the input wiring 49 to the frame ground FGND is reduced, the drift may not still be sufficiently suppressed in some cases.

Accordingly, in the embodiment, a potential difference is given between the input wiring 49 and the frame ground FGND so that a leakage current occurring inside the conversion output circuit 40a described above is offset, and the leakage current I' is generated between the input wiring 49 and the frame ground FGND. That is, the voltage generation circuit 48 is used to apply a voltage with a predetermined magnitude to the pre-compression unit 10 so that the leakage current I' that has the same magnitude and a reverse direction of the leakage current I' generated inside the conversion output circuit 40a flows between the input wiring 49 and the frame ground FGND. Thus, the leakage current I' generated inside the conversion output circuit 40a and the leakage current I' flowing between the input wiring 49 and the frame ground FGND can be offset, and thus it is possible to suppress further effectively the drift. Accordingly, the force detection device 1 can detect a received force with higher precision.

Further, 80% or more of the leakage current I' generated inside the conversion output circuit 40a is preferably offset by the leakage current I' generated between the input wiring 49 and the frame ground FGND, 90% or more is more preferable, and 95% or more is further more preferable, and 100% is most preferable. Thus, it is possible to sufficiently reduce the drift.

In the embodiment, by measuring temperature characteristics of insulation resistance between the input wiring 49 and the frame ground FGND and temperature characteristics of the leakage current generated inside the conversion output circuit 40a in advance and controlling the magnitude of the voltage to be supplied from the voltage source 481 based on an environmental temperature, the leakage current I' generated inside the conversion output circuit 40a can be offset by the leakage current I' flowing between the input wiring 49 and the frame ground FGND with higher precision.

The force detection device 1 according to the embodiment has been described above. As described above, the force detection device 1 includes the force sensor 6 that includes the force sensor element 7 (the piezoelectric element) receiving a force and outputting a charge, the pre-compression unit 10 that pre-compresses the force sensor 6, the conversion output circuit 40a that receives the charge Qa from the force sensor 6 and outputs the voltage Va, and the voltage generation circuit 48 that applies the voltage to the pre-compression unit 10. The conversion output circuit 40a includes the operational amplifier 41 (the charge amplifier unit) and the input wiring 49 (the wiring) electrically connecting the force sensor 6 to the operational amplifier 41. The voltage generation circuit 48 applies the voltage to the pre-compression unit 10 to generate the leakage current I' between the input wiring 49 and the pre-compression unit 10 so that the leakage current I' generated inside the conversion output circuit 40a is offset. Thus, it is possible to more efficiently suppress the drift. Accordingly, the force detection device 1 can detect a received force with higher precision.

Fifth Embodiment

Figure 12:
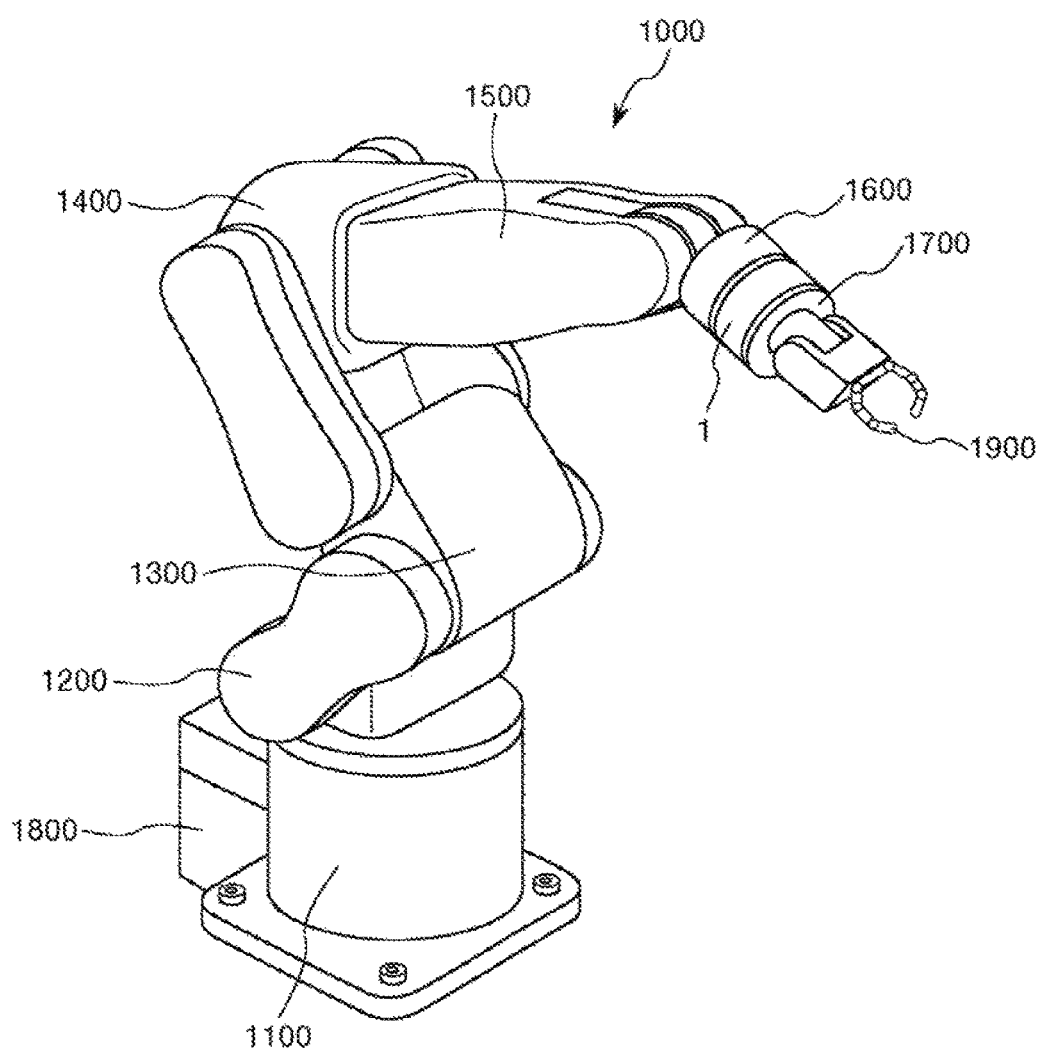
FIG. 12 is a perspective view illustrating a robot according to a fifth embodiment of the invention.

FIG. 12 is a perspective view illustrating a robot according to a fifth embodiment of the invention.

A robot 1000 illustrated in FIG. 12 is, for example, a robot that can be used for a manufacturing step of manufacturing an industrial product such as a precision device. The robot 1000 includes a base 1100 that is fixed to, for example, a floor or a ceiling, an arm 1200 that is connected to the base 1100 to be rotatable, an arm 1300 that is connected to the arm 1200 to be rotatable, an arm 1400 that is connected to the arm 1300 to be rotatable, an arm 1500 that is connected to the arm 1400 to be rotatable, an arm 1600 that is connected to the arm 1500 to be rotatable, an arm 1700 that is connected to the arm 1600 to be rotatable, and a control unit 1800 that controls driving of the arms 1200, 1300, 1400, 1500, 1600, and 1700. A hand connection unit is installed in the arm 1700 and an end effector 1900 suitable for work to be performed by the robot 1000 is mounted on the hand connection unit.

In the robot 1000, the force detection device 1 that detects an external force applied to the end effector 1900 is installed. By feeding a force detected by the force detection device 1 back to the control unit 1800, the robot 1000 can perform precise work. In accordance with the force detected by the force detection device 1, the robot 1000 can detect contact or the like of the end effector 1900 to an obstacle. Therefore, an obstacle avoiding operation, a target damage avoiding operation, or the like which is difficult in position control of the related art can be performed easily, and thus the robot 1000 can perform work safely.

The force detection device 1 is disposed between the arms 1600 and 1700. Although not illustrated, the bottom surface 211 of the first base unit 2 is connected to the arm 1600 and the top surface 311 of the second base unit 3 is connected to the arm 1700. Here, the disposition of the force detection device 1 is not particularly limited. As the force detection device 1, for example, any of the force detection devices 1 described above in the first, second, third, and fourth embodiments can be used.

In this way, the robot 1000 includes the force detection device 1. Therefore, the robot 1000 can obtain the advantages of the above-described force detection device 1, and thus achieve excellent reliability.

Even in the fifth embodiment, it is possible to achieve the advantages of the above-described first embodiment. The configuration of the robot 1000 is not particularly limited. For example, the number of arms may be different from the number of arms of the embodiment. The robot 1000 is not particularly limited. For example, a so-called scalar robot or two-arm robot may be used.

The force detection device and the robot according to the embodiment have been described based on the illustrated embodiments, but the invention is not limited thereto. The configuration of each unit can be substituted with any configuration with the same function. Any other constituent may be added to the invention. The embodiments may be appropriately combined.

The entire disclosure of Japanese Patent Application No. 2017-090242, filed Apr. 28, 2017 is expressly incorporated by reference herein.

What is claimed is:

1. A force detection device comprising:
 a force sensor that has a piezoelectric element receiving a force and outputting a charge;
 a pre-compression unit that pre-compresses the force sensor; and
 a conversion output circuit that receives the charge from the force sensor and outputs a voltage,
 wherein the pre-compression unit is connected to a same first ground as an input of an operational amplifier of the conversion output circuit.

2. The force detection device according to claim 1,
 wherein the pre-compression unit has a same potential as the first ground.

3. The force detection device according to claim 1, further comprising:
 a casing that accommodates the force sensor and the conversion output circuit,
 wherein the casing is short-circuited with a second ground.

4. The force detection device according to claim 1,
 wherein the pre-compression unit includes first and second base units disposed to interpose the force sensor.

5. The force detection device according to claim 4,
 wherein the conversion output circuit is disposed between the first and second base units.

6. A force detection device comprising:
 a force sensor that has a piezoelectric element receiving a force and outputting a charge;
 a pre-compression unit that pre-compresses the force sensor;
 a conversion output circuit that receives the charge from the force sensor and outputs a voltage; and
 a voltage generation circuit that applies the voltage to the pre-compression unit,
 wherein the conversion output circuit includes a charge amplifier unit and a wiring electrically connecting the force sensor to the charge amplifier unit, and
 wherein the voltage generation circuit applies the voltage to the pre-compression unit so that a difference between a voltage of the wiring and the voltage of the pre-compression unit is small.

7. The force detection device according to claim 6,
 wherein the voltage generation circuit includes a voltage source and an attenuation circuit that drops a voltage of the voltage source.

8. The force detection device according to claim 6,
 wherein the pre-compression unit includes first and second base units disposed to interpose the force sensor.

9. A force detection device comprising:
 a force sensor that has a piezoelectric element receiving a force and outputting a charge;
 a pre-compression unit that pre-compresses the force sensor;
 a conversion output circuit that receives the charge from the force sensor and outputs a voltage; and
 a voltage generation circuit that applies the voltage to the pre-compression unit
 wherein the conversion output circuit includes a charge amplifier unit and a wiring electrically connecting the force sensor to the charge amplifier unit, and
 wherein the voltage generation circuit generates a leakage current between the wiring and the pre-compression unit so that a leakage current generated in the conversion output circuit is offset by applying the voltage to the pre-compression unit.

10. A force detection device comprising:
 a force sensor that has a piezoelectric element receiving a force and outputting a charge;
 a pre-compression unit that pre-compresses the force sensor;
 a conversion output circuit that receives the charge from the force sensor and outputs a voltage; and
 a voltage generation circuit that applies the voltage to the pre-compression unit,
 wherein the pre-compression unit includes first and second base units disposed to interpose the force sensor, and
 wherein the conversion output circuit is disposed between the first and second base units.

11. A robot comprising:
 a force detection device including
 a force sensor that includes a piezoelectric element receiving a force and outputting a charge,
 a pre-compression unit that pre-compresses the force sensor, and
 a conversion output circuit that receives the charge from the force sensor and outputs a voltage,
 wherein the pre-compression unit is connected to a same first ground as an input of an operational amplifier of the conversion output circuit.

* * * * *